United States Patent
Asukai

(10) Patent No.: US 9,025,082 B2
(45) Date of Patent: May 5, 2015

(54) IMAGE PROCESSING DEVICE, IMAGE RECOGNITION DEVICE, IMAGE RECOGNITION METHOD, AND PROGRAM

(71) Applicant: Sony Corporation, Minato-ku (JP)

(72) Inventor: Masamichi Asukai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/352,790

(22) PCT Filed: Nov. 1, 2012

(86) PCT No.: PCT/JP2012/078343
§ 371 (c)(1),
(2) Date: Apr. 18, 2014

(87) PCT Pub. No.: WO2013/080739
PCT Pub. Date: Jun. 6, 2013

(65) Prior Publication Data
US 2014/0253804 A1    Sep. 11, 2014

(30) Foreign Application Priority Data
Dec. 2, 2011  (JP) ................. 2011-264445

(51) Int. Cl.
*H04N 9/74* (2006.01)
*H04N 9/76* (2006.01)
*H04N 5/265* (2006.01)
*H04N 21/8358* (2011.01)

(52) U.S. Cl.
CPC ........ *H04N 5/265* (2013.01); *H04N 2201/3233* (2013.01); *H04N 21/8358* (2013.01)

(58) Field of Classification Search
USPC .......... 348/578, 584, 586, 588, 589, 598, 600
IPC ................................. H04N 9/74,9/76
See application file for complete search history.

(56) References Cited

U.S. PATENT DOCUMENTS

| | | | |
|---|---|---|---|
| 2004/0085480 A1* | 5/2004 | Salzer et al. | 348/584 |
| 2006/0086796 A1 | 4/2006 | Onogi | |
| 2008/0089552 A1 | 4/2008 | Nakamura et al. | |
| 2010/0238351 A1* | 9/2010 | Shamur et al. | 348/598 |
| 2011/0007171 A1 | 1/2011 | Okumura et al. | |

FOREIGN PATENT DOCUMENTS

| | | |
|---|---|---|
| JP | 2005-86356 A | 3/2005 |
| JP | 2006-128900 A | 5/2006 |
| JP | 2007-36833 A | 2/2007 |
| JP | 2011-186846 A | 9/2011 |
| WO | WO 2007/015452 A1 | 2/2007 |
| WO | WO 2009/113416 A1 | 9/2009 |

OTHER PUBLICATIONS

International Search Report issued Jan. 29, 2013, in PCT/JP2012/078343.

* cited by examiner

*Primary Examiner* — Sherrie Hsia
(74) *Attorney, Agent, or Firm* — Oblon, McClelland, Maier & Neustadt, L.L.P.

(57) ABSTRACT

There is provided an image processing device including an image insertion unit that inserts into video content an image for recognition identified by image recognition. The image insertion unit inserts the image for recognition so that a display duration of the image for recognition is less than a value near a threshold of visual perception.

10 Claims, 13 Drawing Sheets

IMAGE PROCESSING DEVICE, IMAGE RECOGNITION DEVICE, IMAGE RECOGNITION METHOD, AND PROGRAM

TECHNICAL FIELD

The present disclosure relates to an image processing device, an image recognition device, an image recognition method, and a program.

BACKGROUND ART

Recently, along with the development of image recognition technology, the use of information codes such as two-dimensional barcodes is proliferating. Specifically, if an information code is printed onto a paper medium, for example, and a captured image of the information code is obtained by an image capture device, it becomes possible to recognize the information code by image recognition, and obtain information according to the recognition result.

Note that an information code is recognizable from both a captured image in a still image format and a captured image in a motion image format. For example, as described in Patent Literature 1, by analyzing respective frame images constituting a captured image in a motion image format, the area of an information code in the captured image may be specified, and the information code may be recognized.

CITATION LIST

Patent Literature

Patent Literature 1: JP 2011-186846A

Non-Patent Literature

SUMMARY OF INVENTION

Technical Problem

Additionally, a usage scenario of displaying an information code on a display device is also conceivable. For example, a usage scenario of placing an information code in a partial area of a TV broadcast screen, and a usage scenario of placing an information code on a datacast screen are also conceivable.

However, in the above usage scenarios, the information code impedes viewing of the TV broadcast screen or the datacast screen. Also, switching the display to a datacast screen in order to use the information code is cumbersome.

Accordingly, in the present disclosure, there are proposed a new and improved image processing device, image recognition device, image recognition method, and program for providing an image for recognition, such as an information code, without detracting from the user experience.

Solution to Problem

According to the present disclosure, there is provided an image processing device including an image insertion unit that inserts into video content an image for recognition identified by image recognition. The image insertion unit inserts the image for recognition so that a display duration of the image for recognition is less than a value near a threshold of visual perception.

According to the present disclosure, there is provided an image recognition device including an image selection unit that selects a subset of frame images from a plurality of frame images obtained by image capture, an image recognition unit that identifies an image for recognition by image recognition from a frame image selected by the image selection unit, and a control unit that controls provision of information according to a recognition result by the image recognition unit.

According to the present disclosure, there is provided an image recognition method including selecting a subset of frame images from a plurality of frame images obtained by image capture, identifying an image for recognition by image recognition from the selected frame image, and providing information according to a recognition result according to a result of the image recognition.

According to the present disclosure, there is provided a program for causing a computer to function as an image selection unit that selects a subset of frame images from a plurality of frame images obtained by image capture, an image recognition unit that identifies an image for recognition by image recognition from a frame image selected by the image selection unit, and a control unit that controls provision of information according to a recognition result by the image recognition unit.

Advantageous Effects of Invention

According to the present disclosure as described above, it is possible to provide an image for recognition, such as an information code, without detracting from the user experience.

DESCRIPTION OF EMBODIMENTS

Figure 1:
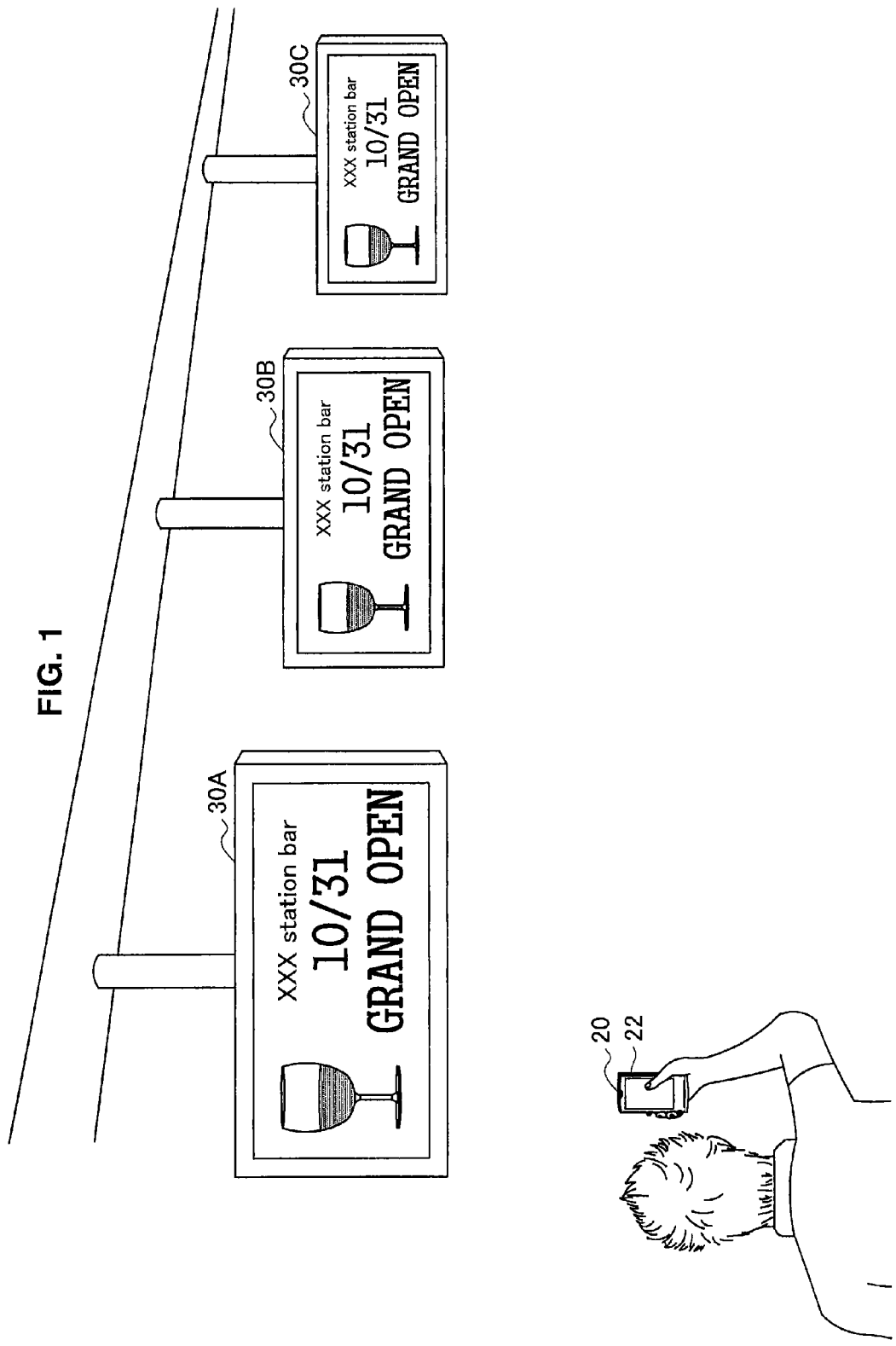
FIG. 1 is an explanatory diagram illustrating an example of a usage scenario of a system according to the present disclosure.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Also, in this specification and the appended drawings, multiple structural elements having substantially the same function and structure may in some cases be distinguished by different letters appended to the same sign. For example, multiple elements having substantially the same function and structure are distinguished as display devices 30A, 30B, 30C, and so on as necessary. On the other hand, when not particularly distinguishing each of multiple structural elements having substantially the same function and structure, only the same sign will be given. For example, the display devices 30A, 30B, and 30C will be simply designated the display device 30 when not being particularly distinguished.

In addition, the present disclosure will be described in the order indicated below.

1. Usage scenario of system according to present disclosure
2. Content processing device
3. Mobile device
4. Exemplary application
5. Hardware configuration
6. Conclusion

1. USAGE SCENARIO OF SYSTEM ACCORDING TO PRESENT DISCLOSURE

Technology according to the present disclosure may be carried out in various embodiments, examples of which are described below. In addition, a system according to the present disclosure is provided with:

A. an image processing device (content processing device 10) that includes an image insertion unit (120) that inserts into video content an image for recognition identified by image recognition, in which the image insertion unit inserts the image for recognition so that a display duration of the image for recognition is less than a value near the threshold of visual perception; and B. an image recognition device (mobile device 20) that includes an image selection unit (230) that selects a subset of frame images from multiple frame images obtained by image capture, an image recognition unit (240) that identifies the image for recognition by image recognition from the frame image selected by the image selection unit, and a control unit (260) that controls the provision of information according to a recognition result by the image recognition unit.

Hereinafter, first, a usage scenario of such a system according to the present disclosure will be described with reference to FIG. 1.

FIG. 1 is an explanatory diagram illustrating an example of a usage scenario of a system according to the present disclosure. As illustrated in FIG. 1, a system according to the present disclosure includes display devices 30A to 30C and a mobile device 20. Note that, although not illustrated in FIG. 1, a system according to the present disclosure is additionally provided with a content processing device that processes content for display on the display device 30.

(Display Device)

The display device 30 displays video content, such as a motion image or a still image. For example, the display device 30 is disposed in a public space as illustrated in FIG. 1, and displays content related to advertising or publicity. Note that the display device 30 may also be a TV placed in a typical home. Also, the content that the display device 30 displays is not limited to advertising or publicity. For example, the display device 30 may also display program content from a digital terrestrial broadcast or satellite broadcast.

(Mobile Device)

The mobile device 20 is an information processing device equipped with image capture functions and a display unit 22. The mobile device 20, upon identifying a specific image for recognition from a captured image by image recognition, displays information corresponding to that image for recognition on the display unit 22. For example, the information corresponding to the image for recognition may be text, a still image, a motion image, audio, or the like, and may also be user guidance information or advertising information or the like. Also, although the following describes an explicit information code such as a two-dimensional code as an example of an image for recognition, the image for recognition may also be an image that does not include an explicit information code.

Also, in FIG. 1, although a smartphone is illustrated as the mobile device 20 given as an example of an image recognition device, the image recognition device is not limited to such an example. For example, the image recognition device may also be an information processing device such as a personal computer (PC), a home video processing device (such as a DVD recorder or VCR), a personal digital assistant (PDA), a home videogame console, or an electric appliance. Additionally, the image recognition device may also be an information processing device such as a mobile phone, a Personal Handyphone System (PHS), a portable music player, a portable video processing device, or a portable videogame console.

(Usage Scenario)

In such a system according to the present disclosure, the display device 30 display content into which an information code is inserted. For this reason, by capturing an image of the display device 30, the mobile device 20 is able to display or output audio of information corresponding to the information code displayed on the display device 30.

(Background)

Figure 2:
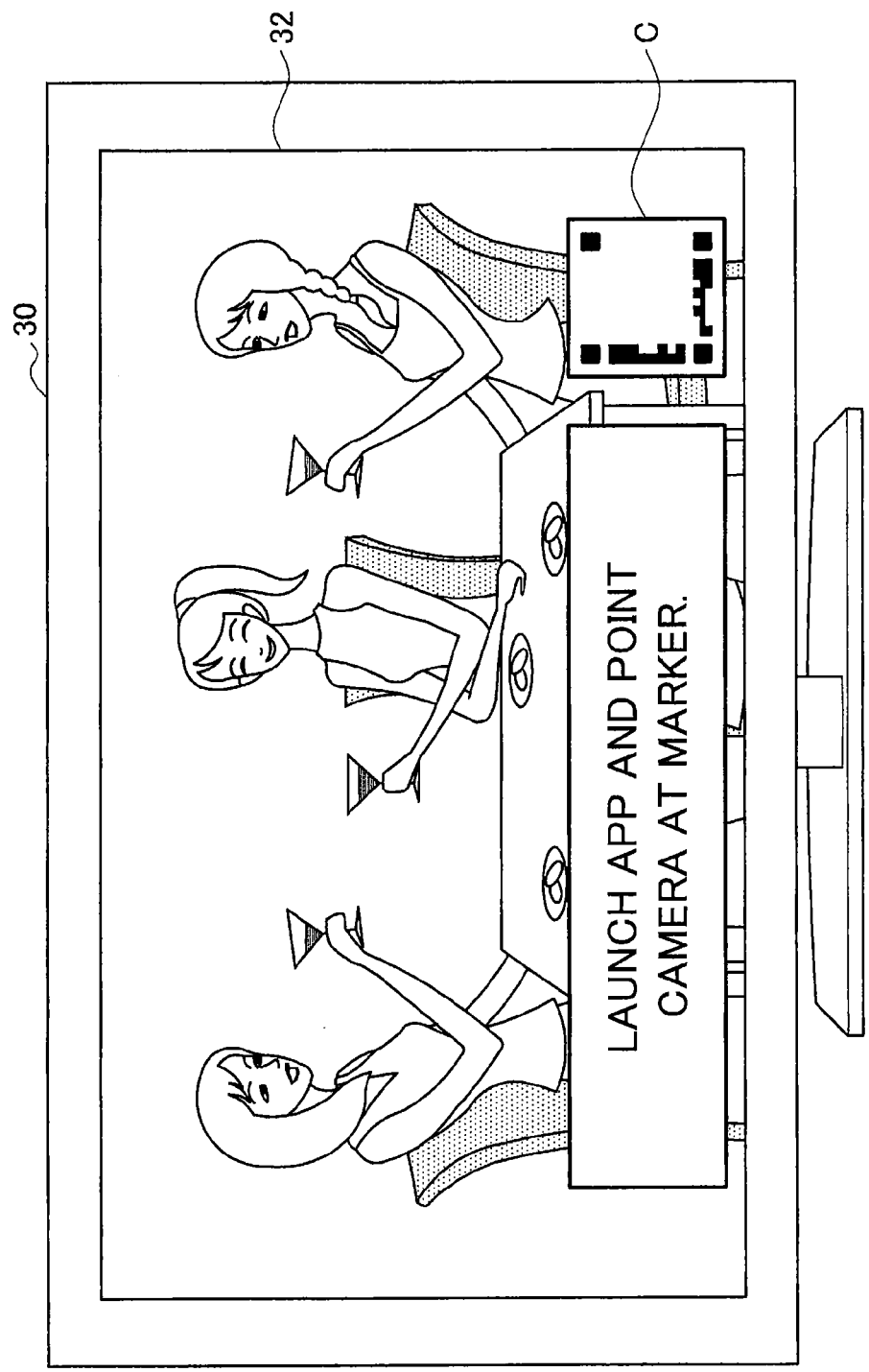
FIG. 2 is an explanatory diagram illustrating an exemplary insertion of an information code.

However, depending on how an information code is inserted, there is a risk of detracting from the user experience. For example, as illustrated in FIG. 2, if an information code C is continually placed in part of a main content screen 32 such as a TV broadcast screen, the information code C impedes viewing of the main content screen 32.

Figure 3:
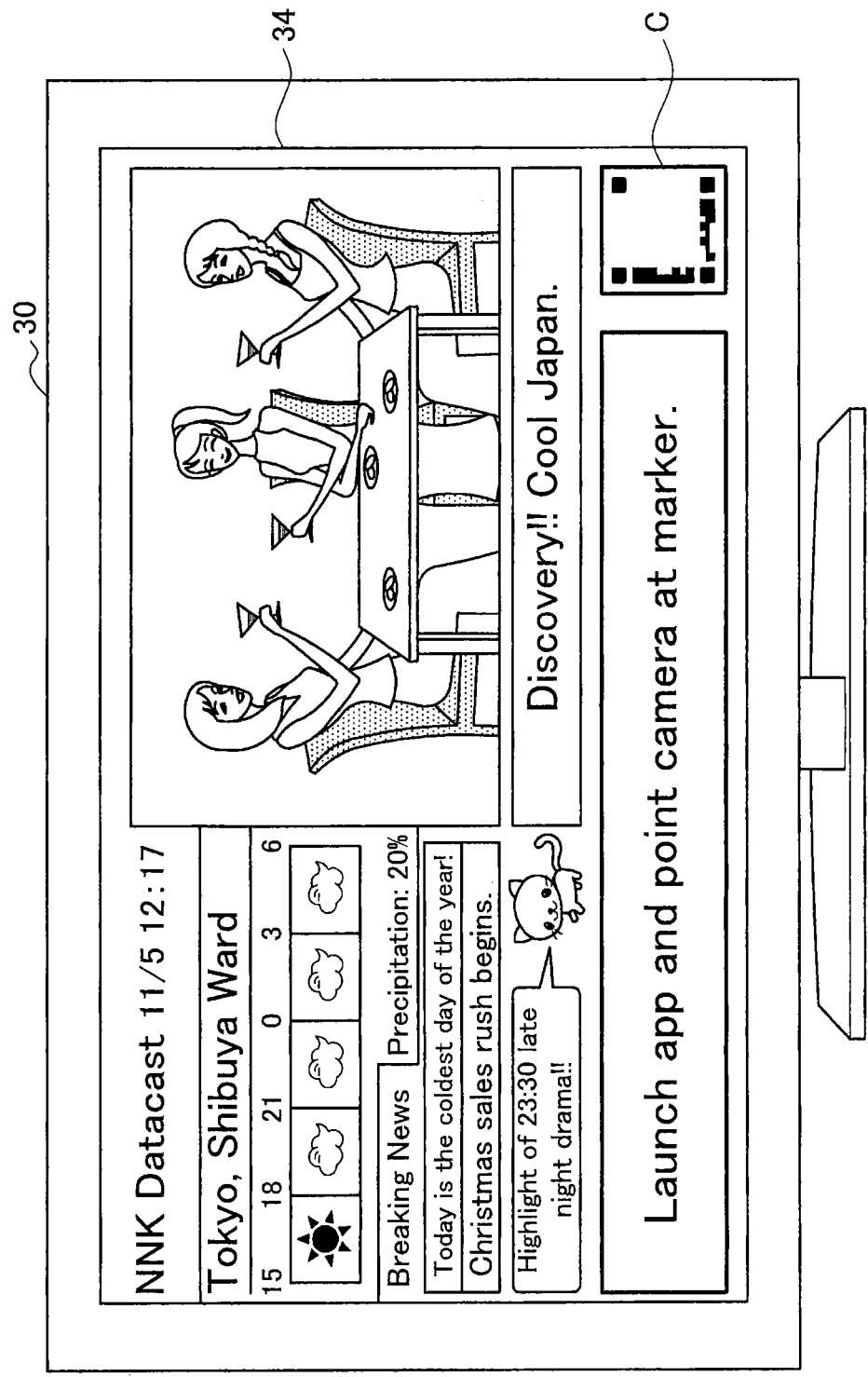
FIG. 3 is an explanatory diagram illustrating another exemplary insertion of an information code.

Also, as illustrated in FIG. 3, a usage scenario that places an information code C on a sub content screen 34 such as a datacast screen is also conceivable, but switching the display to the sub content screen 34 in order to use the information code C is cumbersome.

Accordingly, focusing on the above circumstances led to the creation of an embodiment according to the present disclosure. According to an embodiment of the present disclosure, an information code is inserted into content so that the information code is instantaneously displayed, thereby providing the information code without detracting from the user experience. Hereinafter, a content processing device 10 and a mobile device 20 that realize such an embodiment of the present disclosure will be successively described in detail.

2. CONTENT PROCESSING DEVICE

A content processing device 10 according to an embodiment of the present disclosure processes content by inserting an information code into content made up of multiple frames. Particularly, the content processing device 10 inserts an information code that is hard for a user to perceive, and thus by having a display device 30 display the processed content, it is possible to simultaneously realize ordinary viewing of content while also providing an information code. Hereinafter, such a content processing device 10 will be described in detail.

Figure 4:
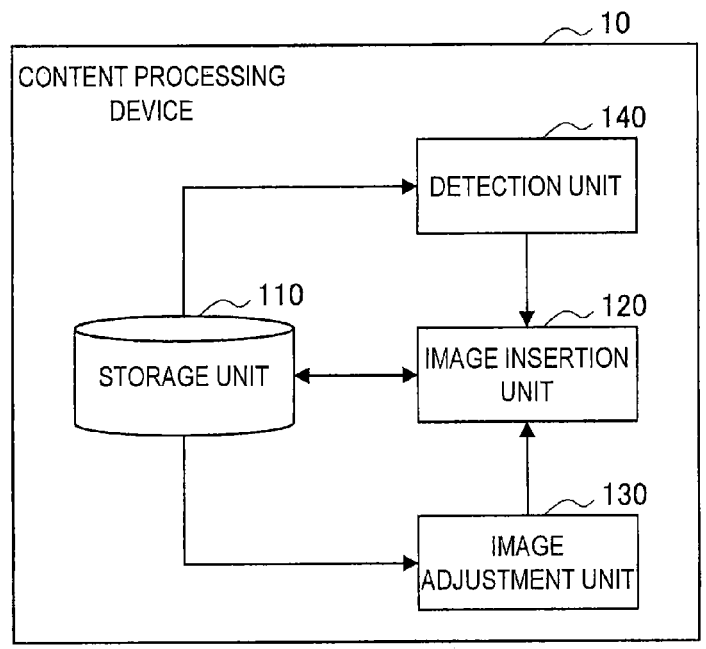
FIG. 4 is a function block diagram illustrating a configuration of a content processing device.

FIG. 4 is a function block diagram illustrating a configuration of a content processing device 10. As illustrated in FIG. 4, the content processing device 10 is equipped with a storage unit 110, an image insertion unit 120, an image adjustment unit 130, and a detection unit 140. Note that although a technique of inserting an information code into content at a content processing device 10 is described below, it is also possible to conduct the insertion of an information code at a display device 30, by providing the display device 30 with an information code and a parameter for insertion (for example, information indicating an insertion position).

The storage unit 110 is a storage medium that stores video content to be processed. In addition, the storage unit 110 may also store content having an information code inserted thereinto by the image insertion unit 120.

The image insertion unit 120 retrieves content from the storage unit 110, and inserts an information code into the content so that the display duration of the information code is less than a value near the threshold of visual perception. Herein, the threshold is generally considered to be approximately 30 ms, but it has been established that this threshold varies depending on the brightness, surface area, central visual field, and peripheral visual field. Accordingly, experimentation under various conditions demonstrated that an information code is easy to perceive if the display duration of the information code is 60 ms or greater. For this reason, in the present embodiment, 60 ms is used as the value near the threshold of visual perception. In other words, the image insertion unit 120 according to the present embodiment inserts an information code so that the display duration of the information code is less than 60 ms. Note that even if the information code is subconsciously perceived, the information code is an abstract image and does not have visual meaning. For this reason, subconscious perception of an information code is thought to have little effect on a user's behavior.

In addition, the image insertion unit 120 may insert an information code by a variety of techniques. Hereinafter, specific examples of information code insertion techniques by the image insertion unit 120 will be described in conjunction with the functions of the image adjustment unit 130 and the detection unit 140. Note that the first to fourth insertion techniques described hereinafter may be used individually or in combination.

(First Insertion Technique)

Figure 5:
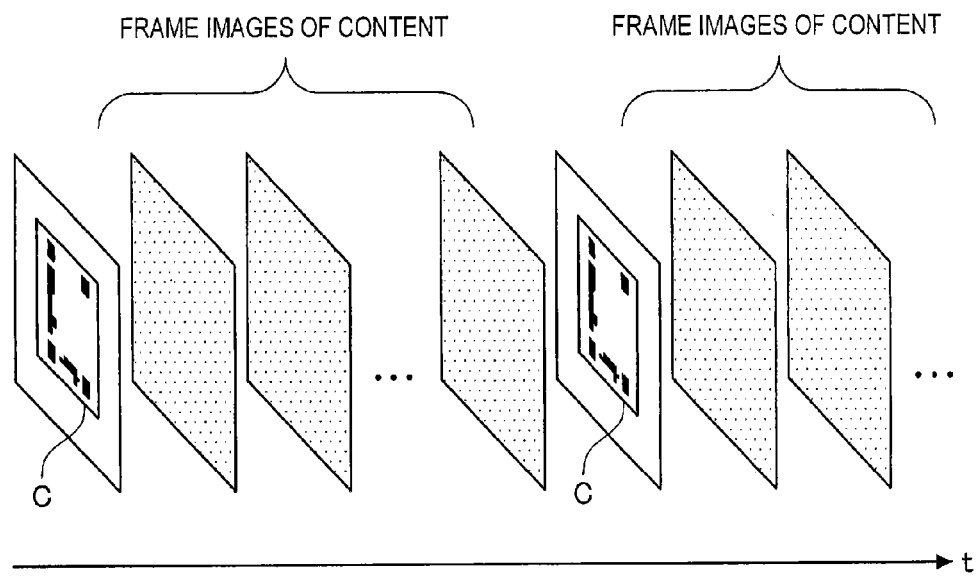
FIG. 5 is an explanatory diagram illustrating a first insertion technique for an information code.

FIG. 5 is an explanatory diagram illustrating a first insertion technique for an information code. As illustrated in FIG. 5, for the first insertion technique, the image insertion unit 120 inserts a black-and-white frame image that includes an information code C into multiple frame images constituting content. For example, the image insertion unit 120 may insert a frame image that includes an information code C into one frame of 30 fps content, so that the display duration of the information code is less than a value near the threshold of visual perception.

However, with the first insertion technique, although the information code is hard to perceive, screen flickering may occur in some cases. In contrast, according to the second to fourth insertion techniques described hereinafter, it is possible to minimize screen flickering.

(Second Insertion Technique)

The image adjustment unit 130 of the content processing device 10 adjusts respective pixel values in a frame image that includes an information code C so as to decrease the difference in brightness and color with respect to a neighboring frame image after insertion. Subsequently, for the second insertion technique, the image insertion unit 120 inserts a frame image that includes the information code C, and whose respective pixel values have been adjusted by the image adjustment unit 130, into the content. A more specific description will be given with reference to FIG. 6.

Figure 6:
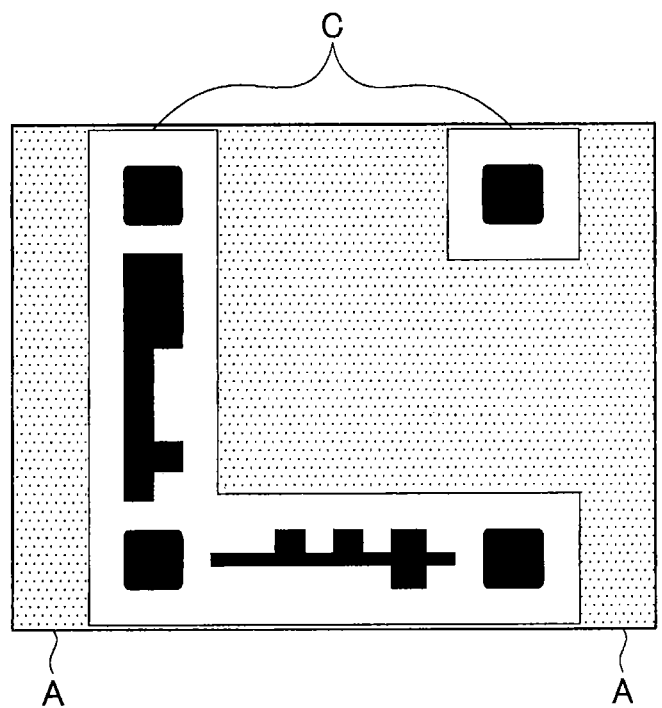
FIG. 6 is an explanatory diagram illustrating a specific example of a frame image that includes an information code C.

FIG. 6 is an explanatory diagram illustrating a specific example of a frame image that includes an information code C. As illustrated in FIG. 6, the frame image to be inserted is made up of an area in which the information code C is formed, and a surrounding area A. The image adjustment unit 130 may adjust the pixel values of the surrounding area A of such a frame image to match the brightness and color of a neighboring frame image. For example, when the neighboring frame image is a blue sky, the image adjustment unit 130 may adjust the surrounding area A to a blue color. With such a configuration, it is possible to minimize flickering that occurs when displaying processed content.

(Third Insertion Technique)

Figure 7:
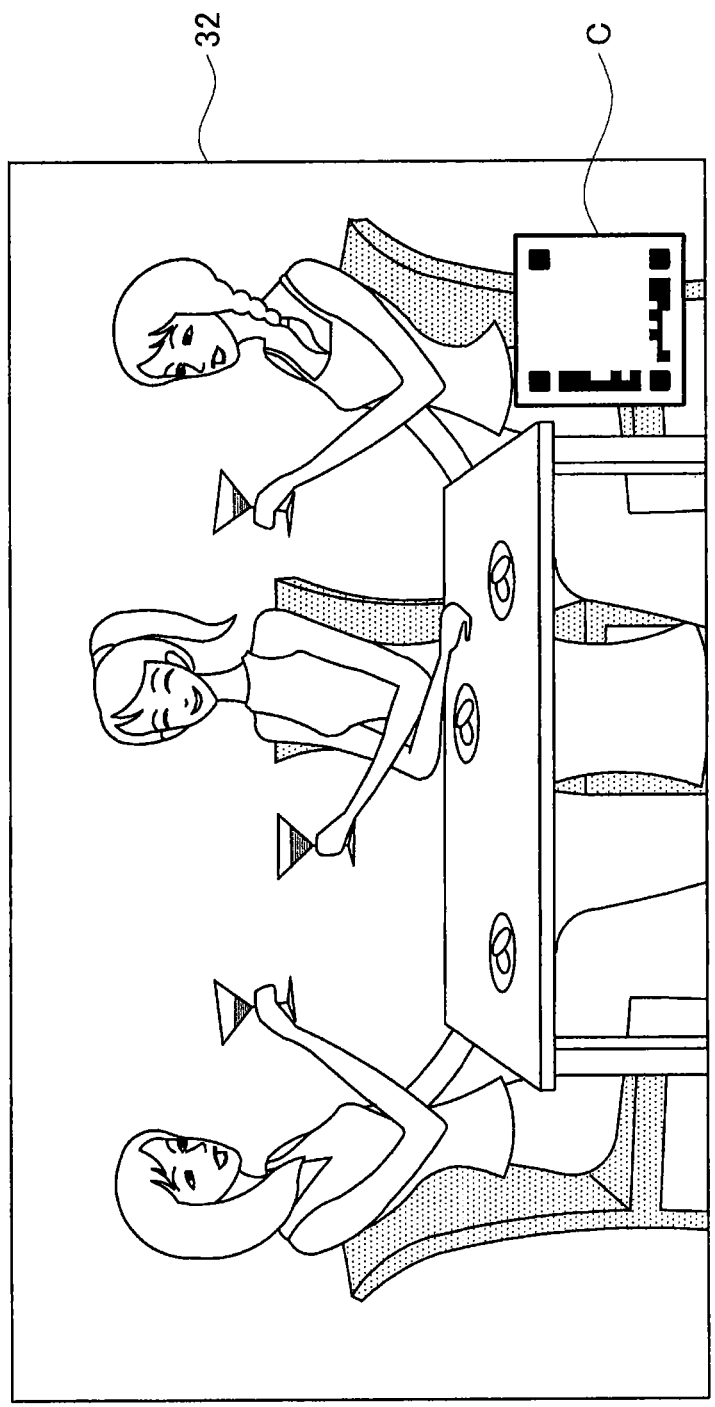
FIG. 7 is an explanatory diagram illustrating a third insertion technique for an information code.

FIG. 7 is an explanatory diagram illustrating a third insertion technique for an information code. As illustrated in FIG. 7, for the third insertion technique, the image insertion unit 320 inserts an information code C into part of a frame image 32 constituting content. Furthermore, since the user is thought to be focusing on the vicinity of the center of the image, there is a possibility that the vicinity of the edges of the image are being taken in by the peripheral visual field rather than the central visual field, and the perception of spatial resolution and color is lowered. Accordingly, as illustrated in FIG. 7, the image insertion unit 120 may insert the information code C in the vicinity of the edges of the image, such as in the right corner. With such a configuration, it is possible to minimize user discomfort and screen flickering.

(Fourth Insertion Technique)

The detection unit 140 of the content processing device 10 detects a frame image at which the scene in the content switches. For example, the detection unit 140 computes a difference between neighboring frames, and detects frame images with a large change of image, such as a cut-in or a cut-out. Subsequently, for the fourth insertion technique, the image insertion unit 120 inserts an information code C into a frame image having a large difference with respect to a neighboring frame image detected by the detection unit 140. Likewise with such a configuration, it is possible to minimize user discomfort and screen flickering with retrograde masking or anterograde masking.

3. MOBILE DEVICE

The above thus describes a content processing device 10 according to an embodiment of the present disclosure. Next, a mobile device 20 according to an embodiment of the present disclosure will be described. A mobile device 20 according to the present embodiment is able to provide a user with information corresponding to an information code by capturing an image of a display device 30 displaying content into which an information code has been inserted by the content processing device 10 discussed above.

(Configuration of Mobile Device)

Figure 8:
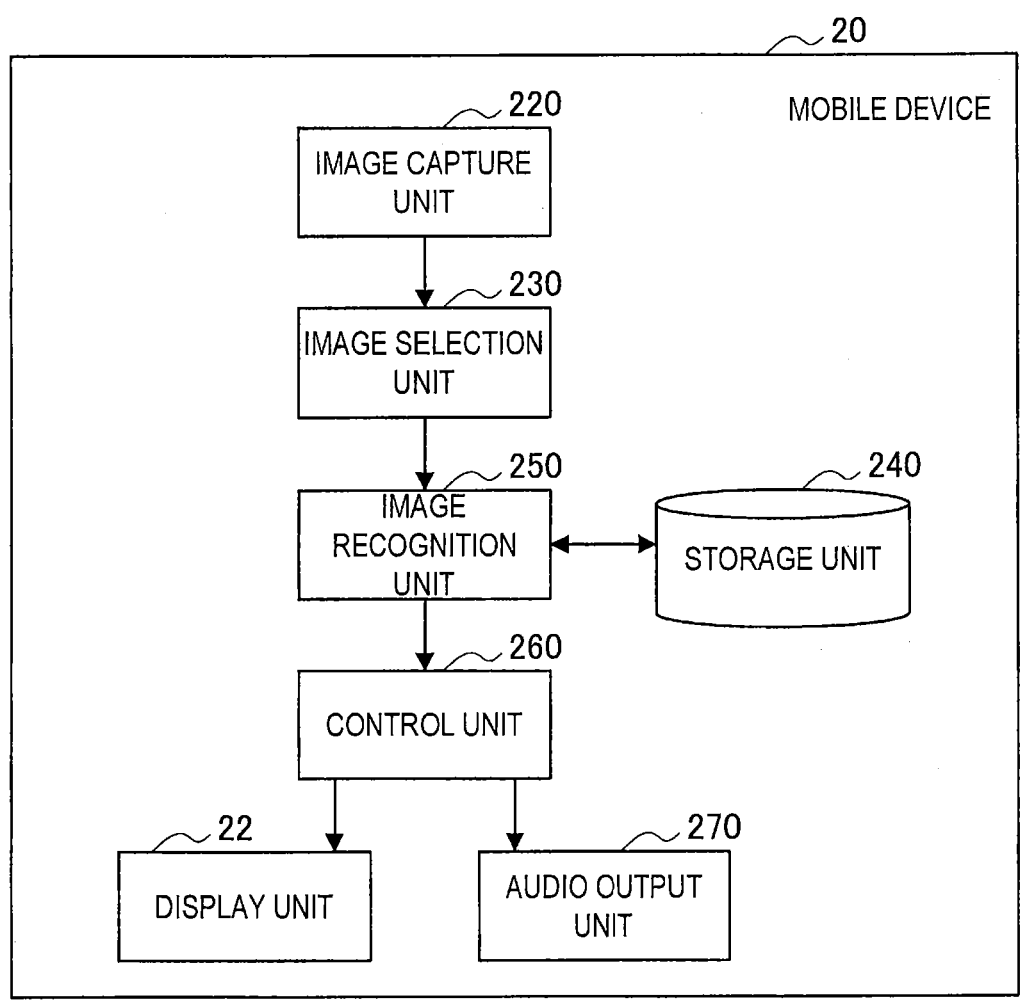
FIG. 8 is a function block diagram illustrating a configuration of a mobile device according to an embodiment of the present disclosure.

FIG. 8 is a function block diagram illustrating a configuration of a mobile device 20 according to an embodiment of the present disclosure. As illustrated in FIG. 8, a mobile device 20 according to an embodiment of the present disclosure is equipped with an image capture unit 220, an image selection unit 230, a storage unit 240, an image recognition unit 250, a control unit 260, a display unit 22, and an audio output unit 270.

The image capture unit 220 captures a subject to acquire a captured image. Specifically, the image capture unit 220 is equipped with a photographic optical system such as a photographic lens and a zoom lens, as well as an image sensor such as a charge-coupled device (CCD) or a complementary metal-oxide-semiconductor (CMOS).

The photographic optical system condenses light emitted from the subject, and forms a subject image on the imaging surface of the image sensor. The image sensor converts the subject image formed by the photographic optical system into an electrical image signal. Herein, the image sensor comprises R component (red) photosensors, G component (green) photosensors, and B component (blue) photosensors, and with the photosensors of each color component, an R image that is the R component detection result, a G image that is the G component detection result, and a B image that is the B component detection result are obtained.

The image selection unit 230 selects a subset of frame images from multiple frame images consecutively obtained by the image capture unit 220. Specifically, the image selection unit 230 selects, from multiple frame images, frame images that possibly include an information code. Conducting image recognition for an information code on all frame images obtained by the image capture unit 220 has a high processing load, and thus by selecting a subset of frame images on which to conduct image recognition, more efficient image recognition is possible.

For example, the image selection unit 230 may select frame images having a partial area that is black and white from the frame images consecutively obtained by the image capture unit 220. According to such a configuration, it is possible to precisely select frame images with an inserted information code in the case of inserting an information code with the "first insertion technique" discussed earlier.

In addition, the image selection unit 230 may compute a difference with a neighboring frame image, and select frame images with a large difference with respect to a neighboring frame image. For example, the image selection unit 230 may compute a total value of the differences of each pixel value between the R image of a given frame and the R image of a neighboring frame, and select that frame image when the total value of the differences exceeds a criterion. According to such a configuration, it is possible to precisely select frame images with an inserted information code in the case of inserting an information code with the "first insertion technique" or "fourth insertion technique" discussed earlier. Additionally, even in the case of inserting an information code with the "second insertion technique" or "third insertion technique", the information code formation area has a difference with a neighboring frame. For this reason, such a configuration is also effective for the case of inserting an information code with the "second insertion technique" or "third insertion technique".

The storage unit 240 is a storage medium that stores an information code and information to be provided to the user in association with each other. Such a storage unit 240 may be a storage medium such as non-volatile memory, a magnetic disk, an optical disc, or a magneto-optical (MO) disc. The non-volatile memory may be flash memory, an SD card, a microSD card, USB memory, electrically erasable programmable read-only memory (EEPROM), or erasable programmable read-only memory (EPROM), for example. Also, the magnetic disk may be a hard disk, a disk-shaped magnetic material disk, or the like. Also, the optical disc may be a Compact Disc (CD), a Digital Versatile Disc (DVD), a Blu-ray Disc (BD) (registered trademark), or the like.

The image recognition unit 250 recognizes an information code from a frame image selected by the image selection unit 230. For example, the image recognition unit 250 may recognize an information code by invoking the technique described in JP 2000-82108A, and acquire information corresponding to the information code from the storage unit 240.

Note that the above recognition of an information code and acquisition of corresponding information may also be realized by cloud computing. In other words, the mobile device 20 may transmit a frame image selected by the image selection unit 230 to a processing server on a network, and the processing server may recognize an information code from the frame image and transmit information corresponding to the information code to the mobile device 20. Furthermore, by having the mobile device 20 transmit each color image to the processing server, it is also possible to generate a composite image on the processing server.

The control unit 260 controls the provision of information acquired by the image recognition unit 250 to the user. For example, in the case in which the information includes video, the control unit 260 causes the display unit 22 to display the information, and in the case in which the information includes audio, the control unit 260 causes the audio output unit 270 to output audio of the information. Note that the audio output unit 270 may be speakers, earphones, headphones, or the like.

Specific Example of Information Provision

Figure 9:
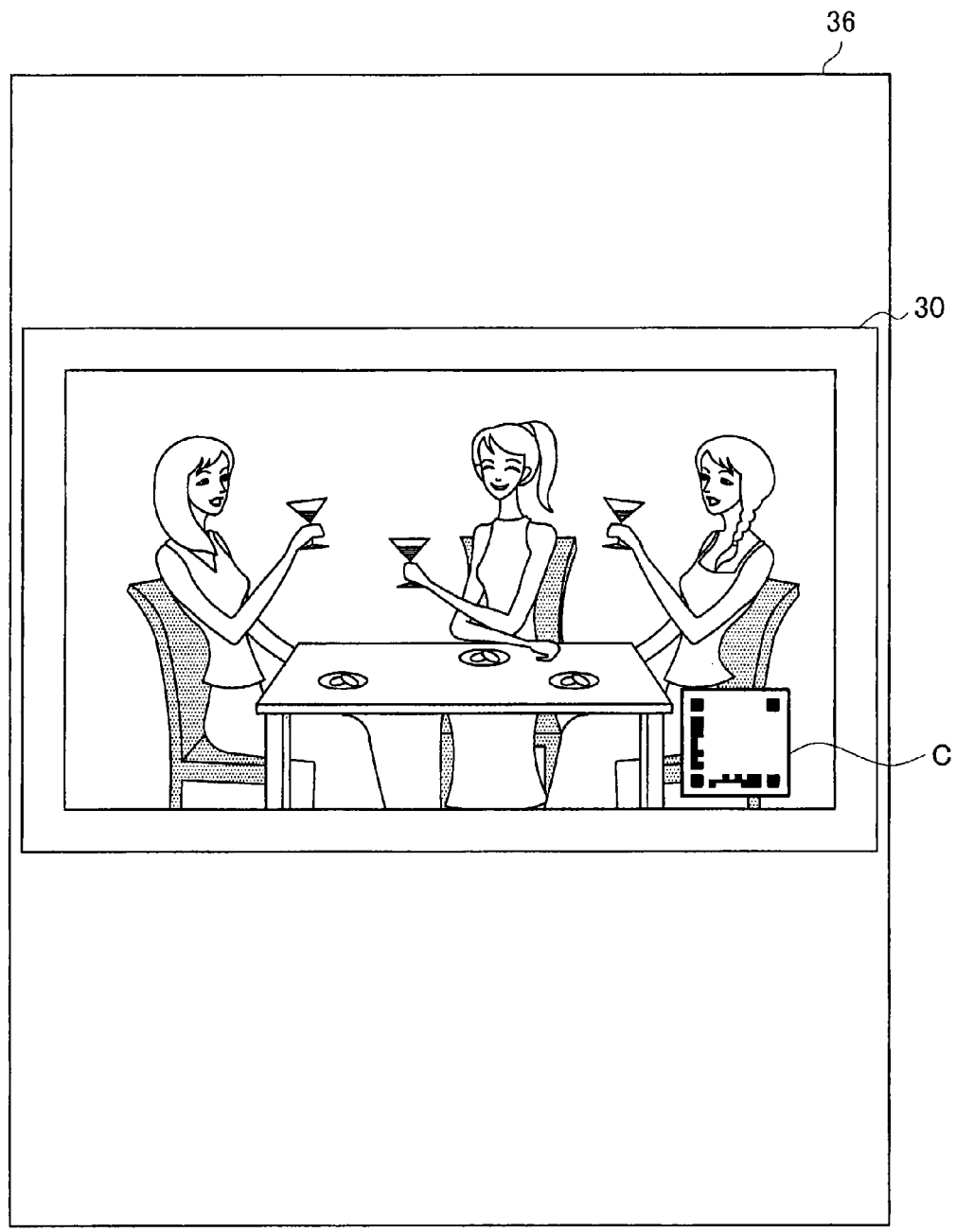
FIG. 9 is an explanatory diagram illustrating a specific example of a frame image selected by an image selection unit.
Figure 10:
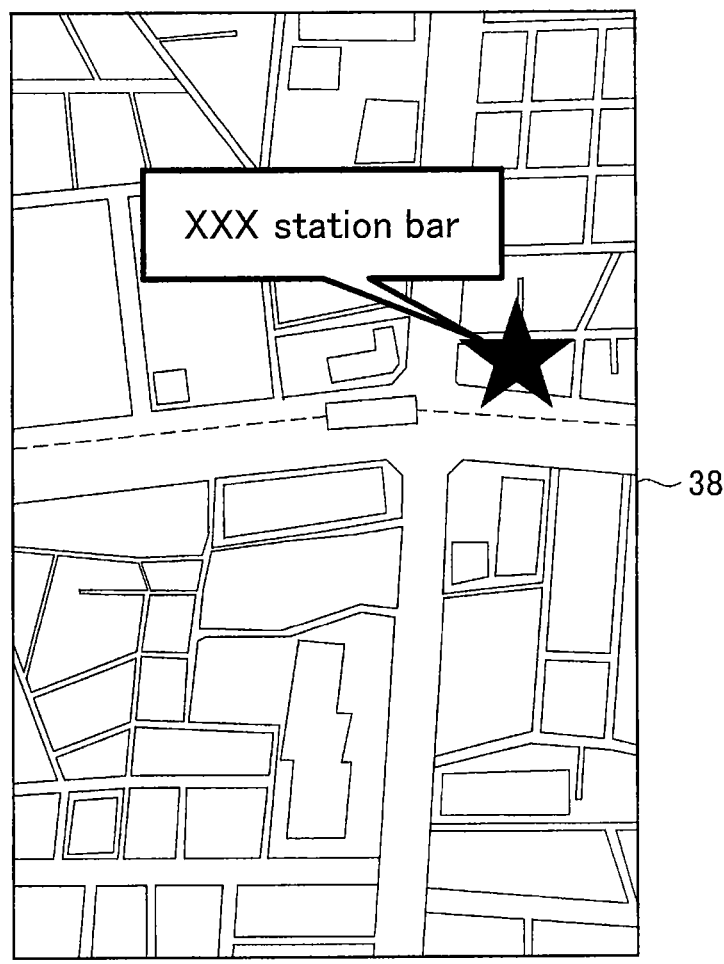
FIG. 10 is an explanatory diagram illustrating a specific example of information corresponding to an information code.

At this point, FIGS. 9 and 10 will be referenced to describe an example of information provided by the mobile device 20 discussed above.

FIG. 9 is an explanatory diagram illustrating a specific example of a frame image selected by the image selection unit 230, while FIG. 10 is an explanatory diagram illustrating a specific example of information corresponding to an information code. As illustrated in FIG. 9, after a frame image 36 that includes a display device 30 displaying an information code C is selected from multiple frame images consecutively obtained by the image capture unit 220, the image recognition unit 250 acquires information corresponding to the information code C from the storage unit 240.

Subsequently, the control unit 260 causes the display unit 22 to display a map screen 38 on the basis of the information acquired by the image recognition unit 250. Herein, although a map screen 38 that indicates the location of "xxx station bar" is illustrated as the information provided to the user in FIG. 10, the information provided to the user is not limited to such an example. For example, in the case in which video/audio information expressing a beer being poured corresponds to the information code C, the audio output unit 270 may output the sound made when a beer is poured, and the display unit 22 may display a video depicting a beer being poured.

(Operation of Mobile Device)

Hereinafter, a configuration of a mobile device 20 according to the present embodiment will be described. Next, operation of a mobile device 20 according to the present embodiment will be summarized with reference to FIG. 11.

Figure 11:
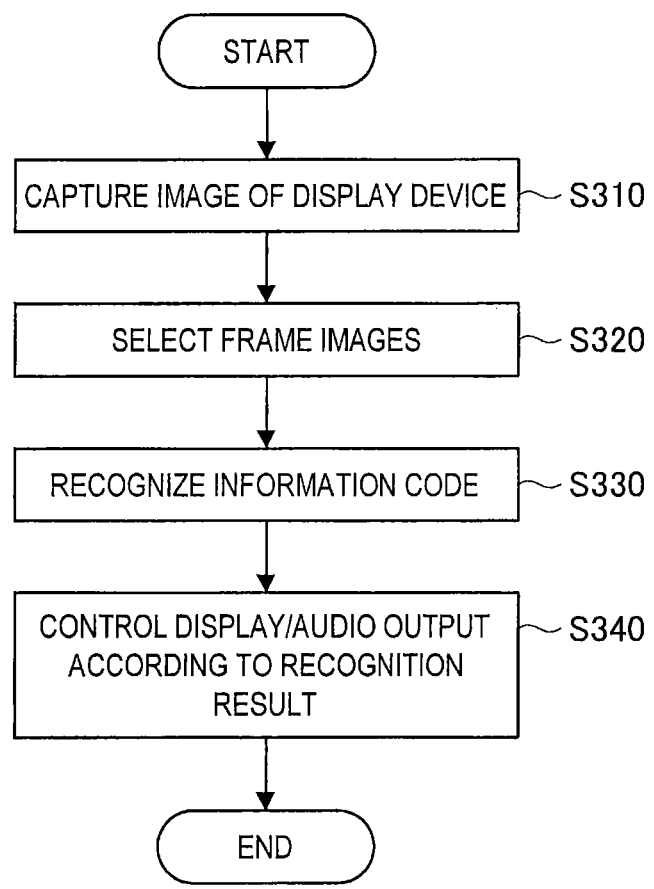
FIG. 11 is a flowchart illustrating operation of a mobile device according to the present embodiment.

FIG. 11 is a flowchart illustrating operation of a mobile client 20 according to the present embodiment. As illustrated in FIG. 11, first, the image capture unit 220 of the mobile device 20 captures an image of a display device 30 displaying content with an information code inserted thereinto (S310). Subsequently, the image selection unit 230 selects a subset of frame images from multiple frame images consecutively obtained by the image capture unit 220 (S320).

After that, the image recognition unit 250 recognizes an information code from a frame image selected by the image selection unit 230, and acquires information corresponding to the information code from the storage unit 240 (S330). The control unit 260 then controls the provision of information acquired by the image recognition unit 250 to the user (S340).

As described above, a mobile device 20 according to the present embodiment conducts image recognition for an information code on only a subset of frame images selected by the image selection unit 230, rather than all frame images consecutively obtained by the image capture unit 220. For this reason, it is possible to reduce the processing load for image recognition.

4. EXEMPLARY APPLICATION

Figure 12:
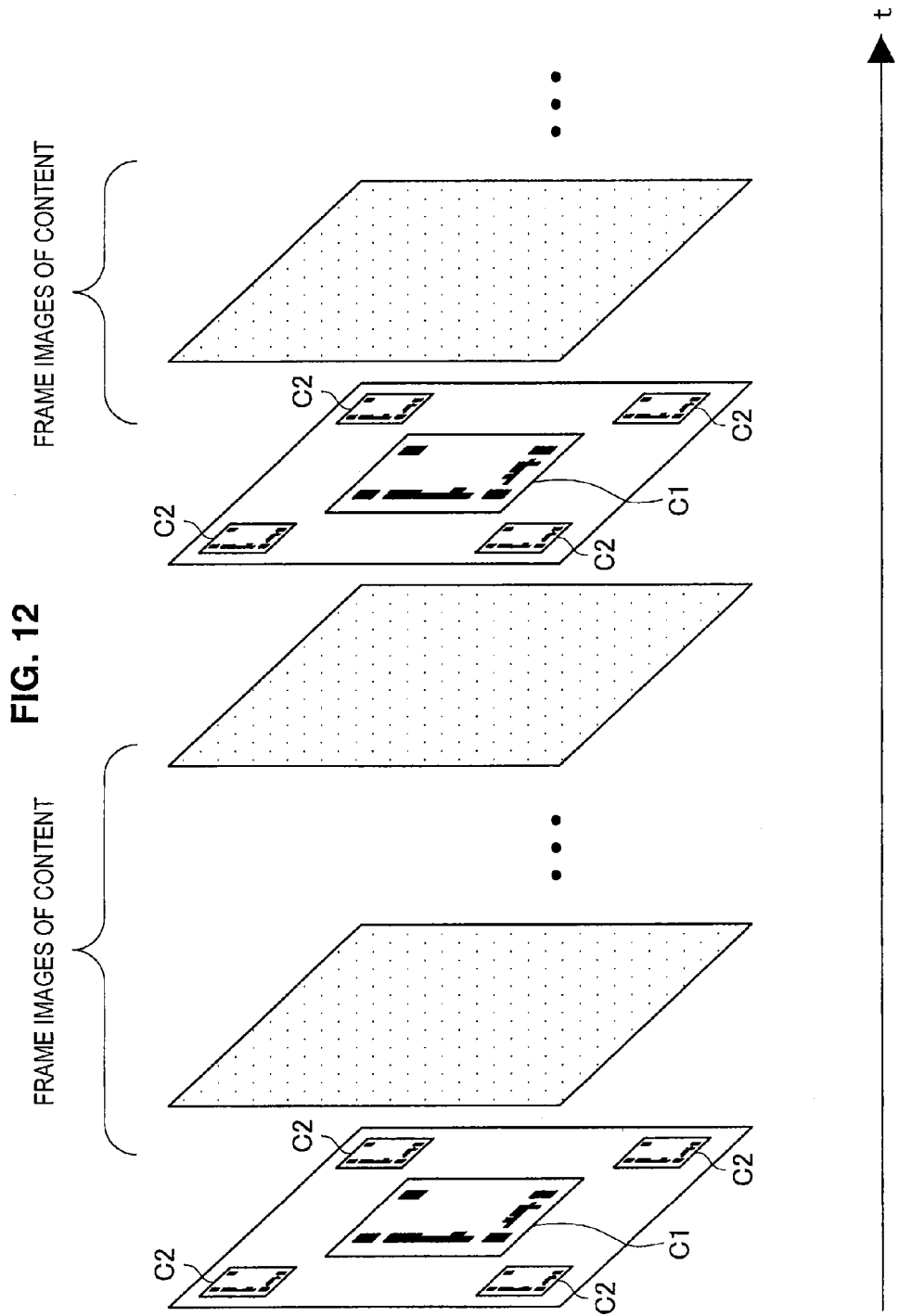
FIG. 12 is a diagram illustrating an exemplary application of the present embodiment.

Next, an exemplary application of the present embodiment will be described with reference to FIG. 12. FIG. 12 is a diagram illustrating an exemplary application of the present embodiment. As illustrated in FIG. 12, the image insertion unit 120 may insert an information code C1, and multiple information codes C2 associated with different information than the information code C1. Note that although FIG. 12 illustrates an example of inserting the information code C1 and the information codes C2 into the same frame image, the information code C1 and the information codes C2 may be inserted into different frame images.

Herein, the information code C1 is larger than the information codes C2. For this reason, the image capture position range over which the information code C1 may be recognized differs from the image capture position range over which the information codes C2 may be recognized. Consequently, it becomes possible to provide the user with different information according to the distance between the display device 30 displaying the information codes and the image capture position of the mobile device 20. This point is described more specifically below.

Figure 13:
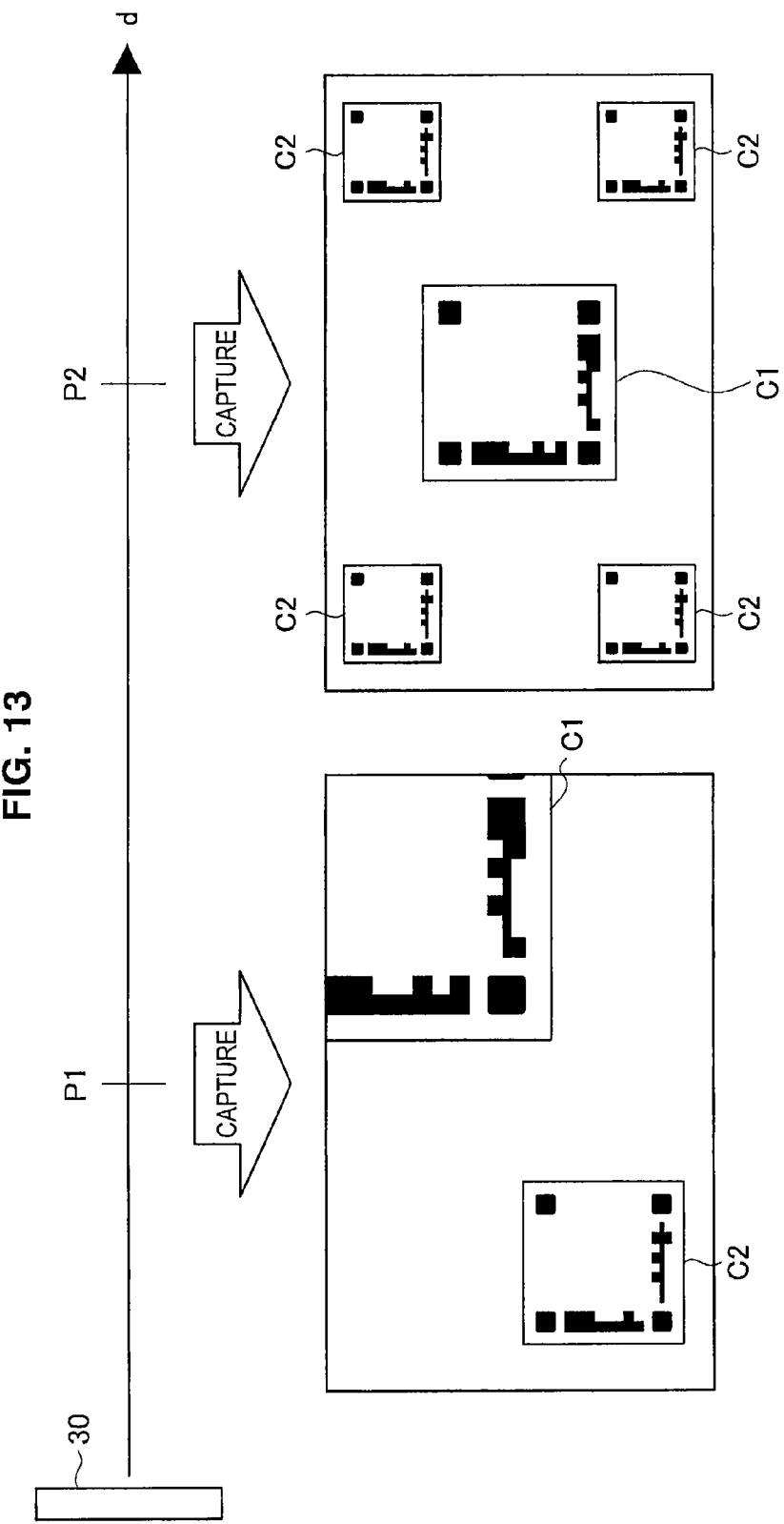
FIG. 13 is an explanatory diagram illustrating a relationship between the image capture position and the frame image obtained by image capture.

FIG. 13 is an explanatory diagram illustrating a relationship between the image capture position and the frame image obtained by image capture. As illustrated in FIG. 13, at an image capture position P2 comparatively distant from the display device 30, the information code C1 is recognizable, whereas the information codes C2 are small and difficult to recognize. On the other hand, at an image capture position P1 comparatively close to the display device 30, the entire information code C1 does not fit inside the angle of view and is thus difficult to recognize, whereas an information code C2 is recognizable.

For this reason, by associating coupon information with the information codes C2 and associating information indicating that coupon information may be obtained by approaching the display device 30 with the information code C1, for example, it becomes possible to draw a user who is distant from a display device 30 closer to the display device 30. Note that the information associated with each information code is not limited to the above example. For example, summary information may be associated with an information code C1 that is recognizable from a comparatively distant position, while detailed information may be associated with an information code C2 that is recognizable from a comparatively close position.

5. HARDWARE CONFIGURATION

The foregoing thus describes respective embodiments of the present disclosure. The image selection process and image recognition process discussed in the foregoing is realized by cooperative action between software, and the hardware of the mobile device 20 described below.

Figure 14:
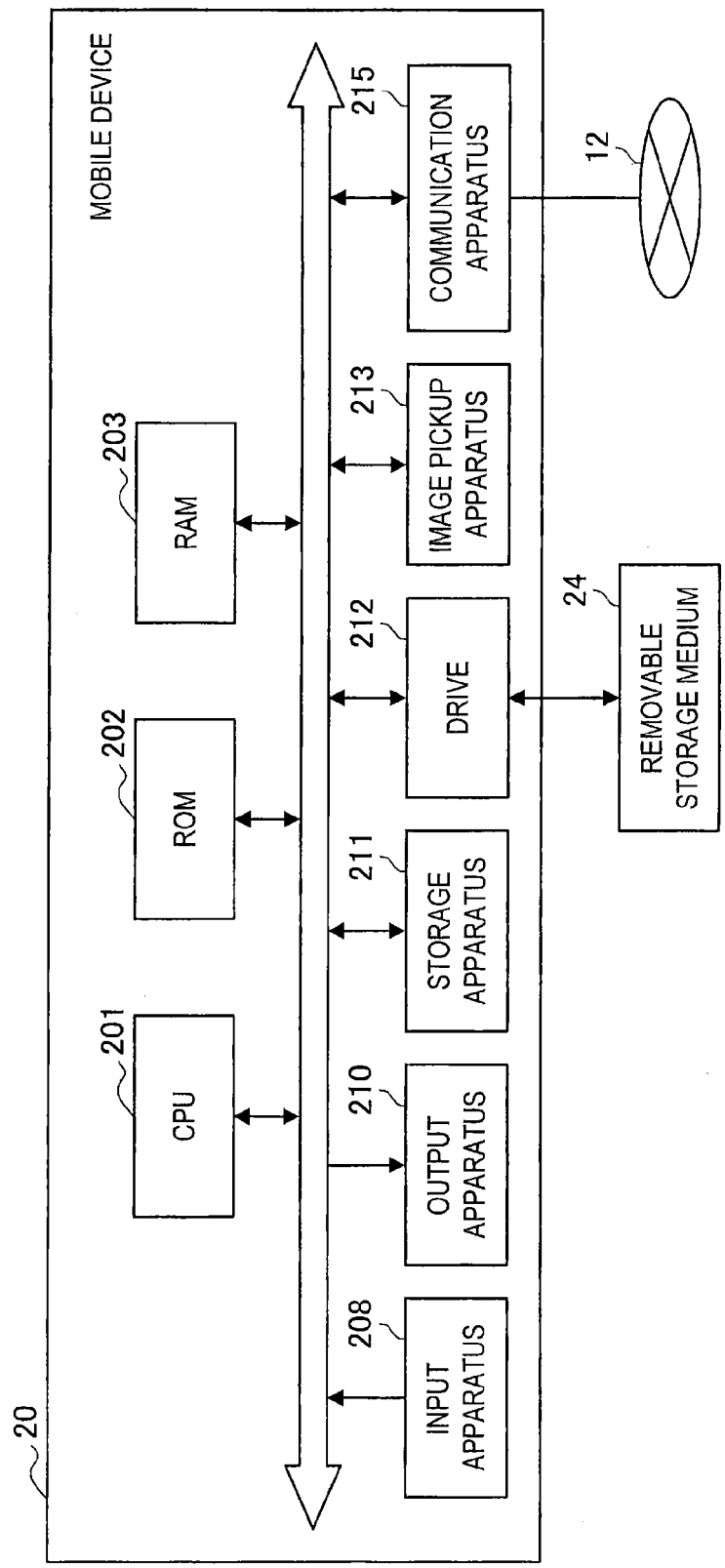
FIG. 14 is an explanatory diagram illustrating a hardware configuration of a mobile device.

FIG. 14 is an explanatory diagram showing a hardware configuration of the mobile device 20. As shown in FIG. 14, the mobile device 20 includes a CPU (Central Processing Unit) 201, ROM (Read Only Memory) 202, RAM (Random Access Memory) 203, an input apparatus 208, an output apparatus 210, a storage apparatus 211, a drive 212, an image pickup apparatus 215, and a communication apparatus 215.

The CPU 201 functions as an operation processing apparatus and a control apparatus, and controls all operations within the mobile device 20, in accordance with various programs. Further, the CPU 201 may be a microprocessor. The ROM 202 stores programs and operation parameters used by the CPU 201. The RAM 203 temporarily stores programs used in the execution of the CPU 201, and parameters which arbitrarily change in these executions. These sections are mutually connected by a host bus configured from a CPU bus or the like.

The input apparatus 208 is constituted with an input means such as a mouse, a keyboard, a touch panel, a button, a microphone, a switch and a lever to input information by a user, and an input controlling circuit to generate an input signal based on the input by the user and to output the signal to the CPU 201. The user of the mobile device 20 can input a variety of data and instruct process operation to the mobile device 20 by operating the input device 208.

The output apparatus 210 includes, for example, a display device such as a liquid crystal display (LCD) apparatus, an OLED (Organic Light Emitting Diode) apparatus, or a lamp. In addition, the output apparatus 210 includes a voice output apparatus such as a speaker or headphones. For example, the display apparatus displays a picked-up image and a generated image. On the other hand, the voice output apparatus converts voice data and outputs a voice.

The storage apparatus 211 is an apparatus for data storage configured as an example of a storage section of the mobile device 20, such as in the present embodiment. The storage apparatus 211 may include a storage medium, a recording apparatus which records data to the storage medium, and an erasure apparatus which erases data recorded in a reading apparatus reading from the storage medium, and the storage medium. The storage apparatus 211 stores the programs executed by the CPU 201 and various data.

The drive 212 is a reader/writer for the storage medium, and is built into the mobile device 20 or is externally attached. The drive 212 reads out information recorded in a removable storage medium 24, such as a mounted magnetic disk, an optical disc, a magneto-optical disc, or semiconductor memory, and outputs the information to the RAM 203. Further, the drive 212 can write information to the removable storage medium 24.

The image pickup apparatus 213 includes an image pickup optical system, such as a photographic lens which converges light and a zoom lens, and a signal conversion element such as a CCD (Charge Coupled Device) or a CMOS (Complementary Metal Oxide Semiconductor). The image pickup system forms a photographic subject in a signal conversion section by converging the light originating from the photographic subject, and the signal conversion element converts the formed photographic subject into an electrical image signal. Note that the image pickup apparatus 213 corresponds to the image capture unit 220 shown in FIG. 4.

The communication apparatus 215 is a communication interface constituted with a communication device and the like to be connected to a network 12, for example. Here, the communication apparatus 215 may be a wireless local area network (LAN) compatible communication device, a LTE (Long Term Evolution) compatible communication device or a wired communication device to perform communication with a cable.

Also, the network 12 is a wired or wireless transmission path for information transmitted from an apparatus connected to the network 12. For example, the network 12 may include public line networks such as the Internet, phone line network and satellite communication network, various kinds of LAN's (Local Area Networks) including Ethernet (registered trademark), and a WAN (Wide Area Network). Also, the network 12 may include a dedicated line network such as an IP-VPN (Internet Protocol-Virtual Private Network).

Note that although the above describes a hardware configuration of the mobile device 20 with reference to FIG. 14, the hardware of the content processing device 10 may be configured in substantially the same way as the mobile device 20, and thus description thereof is omitted.

6. CONCLUSION

As described above, a content processing device 10 according to an embodiment of the present disclosure inserts an information code that is hard for a user to perceive, and thus by having a display device 30 display the processed content, it is possible to simultaneously realize ordinary viewing of content while also providing an information code. Furthermore, the content processing device 10 is also capable of minimizing user discomfort and screen flickering due to insertion of an information code.

In addition, a mobile device 20 according to an embodiment of the present disclosure conducts image recognition for an information code on only a subset of frame images selected by the image selection unit 230, rather than all frame images consecutively obtained by the image capture unit 220. For this reason, it is possible to reduce the processing load for image recognition.

It should be understood by those skilled in the art that various modifications, combinations, sub-combinations and alterations may occur depending on design requirements and other factors insofar as they are within the scope of the appended claims or the equivalents thereof.

For example, each step in the processes of the mobile device 20 in the present specification may not necessarily be processed in the time series according to the order described as a flow chart. For example, each step in the processes of the mobile device 20 may be processed in parallel, even if each step in the processes of the mobile device 20 is processed in an order different than that of the order described as a flowchart.

Further, a computer program for causing hardware, such as the CPU 201, the ROM 202 and the RAM 203 built into the content processing device and the mobile device 20, to exhibit functions similar to each configuration of the above described content processing device and the mobile device 20 can be created. Further, a storage medium storing this computer program can also be provided.

Additionally, the present technology may also be configured as below.

(1)
An image processing device including:
an image insertion unit that inserts into video content an image for recognition identified by image recognition,
wherein the image insertion unit inserts the image for recognition so that a display duration of the image for recognition is less than a value near a threshold of visual perception.

(2)
The image processing device according to (1), wherein the image insertion unit inserts the image for recognition into a subset of frame images constituting the video content.

(3)
The image processing device according to (1) or (2), wherein
the image processing device further includes
a detection unit that detects a frame image at which a scene in the video content switches, and
the image insertion unit inserts the image for recognition into a frame image detected by the detection unit.

(4)
The image processing device according to (1), wherein
the image insertion unit inserts a frame image that includes the image for recognition into the video content in a motion image format, and
the image processing device further includes
an image adjustment unit that adjusts respective pixel values in the frame image according to a neighboring frame image.

(5)
The image processing device according to any one of (1) to (4), wherein
the image insertion unit inserts a first image for recognition, and a second image for recognition associated with information that differs from the first image for recognition, and
the first image for recognition is larger than the second image for recognition.

(6)
The image processing device according to any one of (1) to (4), wherein
the image insertion unit inserts a plurality of images for recognition at different positions in same or different frame images.

(7)
An image recognition device including:
an image selection unit that selects a subset of frame images from a plurality of frame images obtained by image capture;
an image recognition unit that identifies an image for recognition by image recognition from a frame image selected by the image selection unit; and
a control unit that controls provision of information according to a recognition result by the image recognition unit.

(8)
The image recognition device according to (7), wherein the image selection unit detects a difference between two consecutive frame images, and selects one of two frame images whose difference exceeds a criterion.

(9)
The image recognition device according to (7), wherein the image selection unit selects a frame image having a partial area that is black and white from the plurality of frame images.

(10)
An image recognition method including:
selecting a subset of frame images from a plurality of frame images obtained by image capture;
identifying an image for recognition by image recognition from the selected frame image; and
providing information according to a recognition result according to a result of the image recognition.

(11)
A program for causing a computer to function as:
an image selection unit that selects a subset of frame images from a plurality of frame images obtained by image capture;
an image recognition unit that identifies an image for recognition by image recognition from a frame image selected by the image selection unit; and
a control unit that controls provision of information according to a recognition result by the image recognition unit.

REFERENCE SIGNS LIST 10 content processing device
20 mobile device
22 display unit
30 display device
110 storage unit
120 image insertion unit
130 image adjustment unit
140 detection unit
220 image capture unit
230 image selection unit
240 storage unit
250 image recognition unit
260 control unit
270 audio output unit

The invention claimed is:
1. An image processing device comprising:
circuitry configured to
insert into video content a frame image that includes an image for recognition identified by image recognition; and
adjust only pixel values of the frame image not included in the image for recognition according to a neighboring frame image,
wherein the circuitry inserts the frame image so that a display duration of the image for recognition is less than a value near a threshold of visual perception.
2. The image processing device according to claim 1, wherein
the circuitry inserts the image for recognition into a subset of frame images constituting the video content.
3. The image processing device according to claim 1, wherein
the circuitry is further configured to detect a frame image at which a scene in the video content switches, and
the circuitry inserts the image for recognition into a detected frame image.
4. The image processing device according to claim 1, wherein the circuitry inserts the frame image that includes the image for recognition into the video content in a motion image format.
5. The image processing device according to claim 1, wherein
the circuitry inserts a first image for recognition, and a second image for recognition associated with information that differs from the first image for recognition, and
the first image for recognition is larger than the second image for recognition such that an image capture position range over which the first image is recognizable is different than an image capture position range over which the second image is recognizable.
6. The image processing device according to claim 1, wherein the circuitry inserts a plurality of images for recognition at different positions in same or different frame images.
7. An image recognition device comprising:
circuitry configured to
select a subset of frame images from a plurality of frame images obtained by image capture, wherein the circuitry selects frame images having a partial area that is black and white;
identify an image for recognition by image recognition from a selected frame image; and
provide information according to a recognition result.
8. The image recognition device according to claim 7, wherein the circuitry detects a difference between two consecutive frame images, and selects one of two frame images whose difference exceeds a criterion.
9. An image recognition method comprising:
selecting a subset of frame images from a plurality of frame images obtained by image capture, wherein frame images having a partial area that is black and white are selected;
identifying an image for recognition by image recognition from a selected frame image; and
providing information according to a recognition result according to a result of the image recognition.
10. A non-transitory computer-readable storage medium storing computer-readable instructions thereon, which, when executed by a computer, cause the computer to perform an image recognition method comprising:
selecting a subset of frame images from a plurality of frame images obtained by image capture, wherein frame images having a partial area that is black and white are selected;
identifying an image for recognition by image recognition from a selected frame image; and
providing information according to a recognition result.

* * * * *